Figure 1:
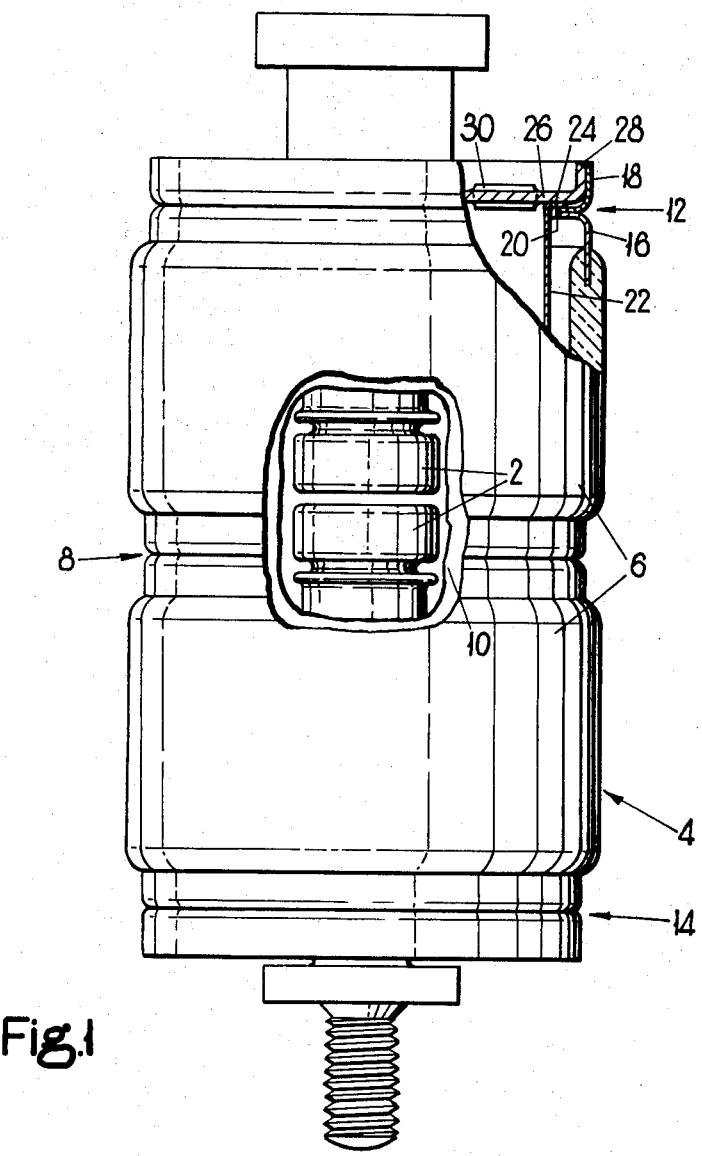

United States Patent
Atkinson

[15] 3,694,601
[45] Sept. 26, 1972

[54] ELECTRIC SWITCHES

[72] Inventor: Denzil Malcolm Atkinson, 30 Bournehill, Palmers Green, London, N.13, England

[22] Filed: Nov. 12, 1970

[21] Appl. No.: 88,901

[30] Foreign Application Priority Data

Nov. 12, 1969 Great Britain..........55,421/69

[52] U.S. Cl. .............................................200/144 B
[51] Int. Cl. ..............................................H01h 33/66
[58] Field of Search ..................................200/144 B

[56] References Cited

UNITED STATES PATENTS

| 1,905,751 | 4/1933 | Rankin....................200/144 B |
| 2,392,099 | 1/1946 | Pollard, Jr..........200/144 B X |

Primary Examiner—Robert S. Macon
Attorney—Misegades & Douglas

[57] ABSTRACT

To facilitate batch production of vacuum-type circuit-interrupting devices, the envelope of such a device has an insert formed with one or more holes for gas extraction during vacuum bake-out and for sealing on completion of bake-out by means of a solder, and possibly also a blanking member, previously placed in the insert. A gold-indium alloy solder is suitable where the bake-out temperature is limited to about 500° C.

6 Claims, 4 Drawing Figures

ELECTRIC SWITCHES

This invention relates to vacuum-type circuit interrupting devices, such as vacuum interrupters and vacuum spark gaps, for interrupting electric power circuits. Such devices comprise cooperating contacts or electrodes inside an evacuated envelope. In operation to interrupt such circuits in which current is flowing, arcing occurs between the contacts or electrodes.

To achieve satisfactory performance in operation, the internal parts of such devices must be thoroughly de-gassed. It is convenient to do this by baking out a batch of devices under vacuum in an evacuated oven.

It has been proposed to seal the envelope of such a device by means of a solder which, in the form of a crinkle washer, is placed between two mating tubular peripheral parts of the envelope, one part on top of the other. During bake-out at a temperature lower than that at which the solder will melt or soften, the crinkle formation of the solder washer allows gases to escape from the interior of the envelope. When the batch of devices is sufficiently baked out and evacuated, the temperature is raised to melt the solder. The upper part of the envelope, which had been sitting on the crinkle washer, then seats itself on the lower part with a layer of the solder between them. On subsequent cooling, while still under vacuum, the solder solidifies to form a sealed joint between the two parts of the envelope.

This crinkle washer technique has disadvantages. It is undesirable to rely on such a soldered joint constituting a major structural component of the evacuated envelope. Moreover, there is no known solder which can be made into sheet or wire for the crinkle washer and at the same time has a melting point low enough to enable this technique to be used where the bake-out temperature is limited to 500° C. Glass envelopes involve such a temperature limitation; although ceramic envelopes can be baked out at much higher temperatures, it is often unnecessary to do so for the purpose of de-gassing, in which case it is more economical to bake them out at 500°° C or less.

According to one aspect of the invention, the evacuated envelope of such a circuit-interrupting device has an insert formed with one or more holes for the extraction therethrough of gases from the interior of the envelope during vacuum bake-out of the device, the envelope being sealed in vacuum-tight manner by sealing means, comprising a solder, capable of blanking off the hole or holes automatically when, on completion of bake-out, the temperature is raised slightly to melt the solder and then lowered to allow the solder to solidify.

The sealing means may further comprise a plate or other blanking member which is joined in vacuum-tight manner to the insert by means of the solder so as to cover the hole or holes.

Preferably, however, the sealing means is constituted by the solder alone, the insert being formed with several such holes into which the solder is melted, the holes being so located and sufficiently small to retain the molten solder by virtue of its surface tension. The solder can be a gold-indium alloy if the interrupting device is baked out at around 500° C. A particularly useful alloy has been found, which is 81:19 Au:In by weight; this has a solidus of about 450° C and a liquidus of about 488° C in equilibrium conditions but up to 500° C in practical conditions. This alloy can be provided in the form of lumps or granules. Its surface tension is high, as is required where it is to be melted into the holes in the insert, and its distinct solidus allows of a period of baking at a temperature close to 450° C: in this latter respect it may be noted that silver-tin alloy has been found to be unsuitable.

Figure 2:
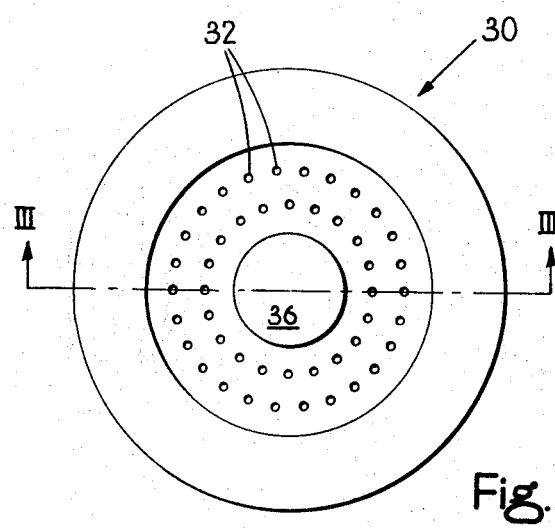
Figure 3:
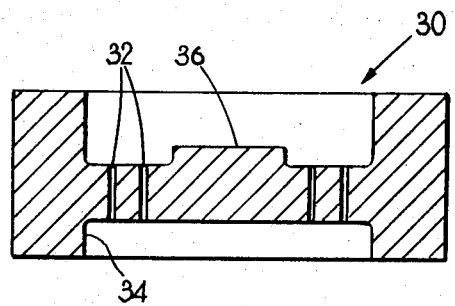
Figure 4:
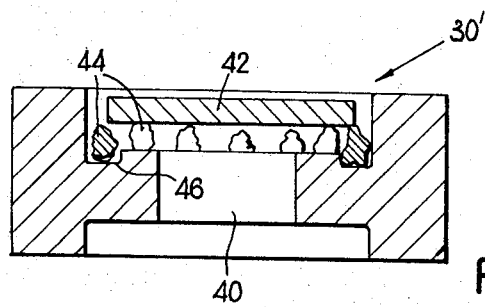

Embodiments of the invention will now be described, by way of example, with reference to the accompanying drawings in which:

FIG. 1 is a side view of a vacuum interrupter with parts of its envelope cut away to show its internal structure;

FIGS. 2 and 3 are, respectively, a plan view and a side view, cross-sectioned on the line III—III in FIG. 2, of a preferred form of an evacuation and sealing insert which is shown in FIG. 1 but could equally well be provided in another design of vacuum interrupter or in another kind of vacuum-type electric circuit interrupting device; and FIG. 4 is a cross-sectional side view of another possible form of such insert, with a blanking plate.

Referring first to FIG. 1, the illustrated vacuum interrupter comprises a pair of cooperating contacts 2 within an envelope 4 evacuated to a pressure below 0.001 mm Hg. It is designed for normal currents of several thousand amperes and circuit voltages of several thousand volts.

The envelope comprises a pair of tubular glass portions 6 each sealed at its inner end to a central interconnecting annular member 8 of metal. The interconnecting member is formed with an inwardly extending flange (not shown) which locates a main tubular shield 10 surrounding the contacts 2.

The outer ends of the glass portions 6 are sealed to respective end rings 12 and 14. Each of the end rings is constituted by a pair of inwardly flanged annular members (an inner member 16 and an outer member 18) placed with their flanges adjacent and welded together around the inner periphery 20 of the flanges. An internal end shield 22 is secured by having an outwardly extending flange 24 thereof clamped between the flange of the outer member 18 of the end ring and a transverse end plate 26 which has an axially extending flange and fits into the latter member. The envelope assembly is completed by welding around the periphery 28 of this flange and the adjacent end of the end ring member 18.

An evacuation and sealing insert 30 is provided in one of the end plates (26). The insert is secured and sealed around its periphery by brazing in an aperture of suitable size in the end plate.

The insert 30 is preferably of the form shown in FIGS. 2 and 3. This is a circular disc of copper or other suitable material recessed on both sides. A multitude of holes 32, about 1/32 inch in diameter, are drilled through an annular portion of the recessed part of the disc. The number and size of the holes is chosen to allow an adequate rate of extraction therethrough of gases from the interior of the envelope of the interrupting device during vacuum bake-out, and to make the holes sufficiently small to retain molten solder by virtue of its surface tension. In regard to this latter factor it is important to locate the holes so that they are spaced apart from the periphery 34 of the inner recess – i.e., the recess which will be on the inside of the envelope. A central boss 36 is provided in the outer recess to strengthen the recessed part and to reduce the quantity of solder required.

The interrupting device is placed with others in a vacuum furnace, with the inserts facing upwards as shown in FIG. 1. A quantity of suitable solder is placed in the outer recess of the insert 30 of each device, the solder being in a form which will not significantly impede the extraction of gases during bake-out. The quantity is sufficient to fill all the holes 32 and at least a part of the depth of the outer recess when the solder is melted.

The furnace is evacuated and heated to bake out the interrupting devices at a temperature below the solidus temperature of the solder. On completion of the bake-out the temperature is raised above the liquidus temperature of the solder, so that the solder melts and flows into the holes 32. Then the interrupting devices are allowed to cool so that the solder solidifies and seals the evacuated envelopes of the devices.

With a glass-enveloped device such as that of FIG. 1 and with the insert 30 made of copper, the solder is preferably the above-mentioned 81:19 Au:In alloy. This can be placed in the outer recess in the form of a single lump or in the form of granules which may be about 1/16 inch in size. The bake-out temperature is just below 450° C and the temperature for subsequently melting the solder into the holes is about 500° C.

Another possible form of insert 30' is shown in FIG. 4. This is also a circular disc of copper or other suitable material recessed on both sides, but it has a single central hole 40 which, after bake-out of the interrupting device, is sealed by a blanking plate in the form of a disc 42 of similar material. The blanking disc is sealed to the insert by solder which, in the form of granules 44, is placed in an annular channel 46 in sufficient quantity to fill the channel and provide a solder joint between the insert and the blanking disc. This method of sealing, while equally convenient as regards batch production of interrupting devices, is thought to be less reliable than the method described with reference to FIGS. 2 and 3, because it is difficult to ensure that the blanking disc seats itself properly and is hermetically sealed by the solder.

A blanking plate such as 42 could be used with an insert having several holes such as that of FIGS. 2 and 3. However, this is not recommended, because of the difficulties just mentioned.

I claim:

1. A vacuum-type circuit-interrupting device whose evacuated envelope has a metal portion formed with a multiplicity of holes for the extraction therethrough of gases from the interior of the envelope during vacuum bake-out of the device, the envelope being sealed in a vacuum-tight manner by a solder capable of blanking off the holes automatically when, on completion of bake-out, the temperature is raised to melt the solder and then lowered to allow the solder to solidify, the holes being so located and sufficiently small to retain the molten solder by virtue of its surface tension.

2. A circuit-interrupting device as claimed in claim 1, wherein the metal portion is formed by a metal member inserted in a wall of the envelope and having a recess in its outer side, the holes being formed in the recessed part of the member.

3. A circuit-interrupting device as claimed in claim 2, wherein the member has a central boss within the recess, and the holes are located in a part of the member between the boss and the periphery of the recess.

4. A circuit-interrupting device as claimed in claim 1, wherein the metal portion is of copper and the solder is a gold-indium alloy.

5. A circuit-interrupting device as claimed in claim 4, wherein the alloy consists substantially of 81 percent gold and 19 percent indium by weight.

6. A vacuum-type circuit-interrupting device comprising a pair of cooperating circuit-interrupting contacts disposed coaxially within, and having conductive supports extending axially out of an evacuated envelope which comprises a pair of tubular glass portions interconnected end-to-end by an annular metal portion to which the adjacent ends of the glass portions are joined in vacuum-tight manner, the other ends of the glass portions being closed by respective metal end plates welded to respective tubular metal end rings to which the respective other ends of the glass portions are joined in vacuum-tight manner, one of the end plates having a metal insert formed with a multiplicity of holes for the extraction therethrough of gases from the interior of the envelope during vacuum bake-out of the device, the envelope being sealed in vacuum tight manner by a solder capable of blanking off the holes automatically when, on completion of bake-out, the temperature is raised slightly to melt the solder and then lowered to allow the solder to solidify, the holes being so located and sufficiently small to retain the molten solder by virtue of its surface tension.

* * * * *